US005135020A

United States Patent [19]

Rausch

[11] Patent Number: 5,135,020

[45] Date of Patent: Aug. 4, 1992

[54] PRESSURE SEQUENCE VALVE

[75] Inventor: Georg Rausch, Lohr, Fed. Rep. of Germany

[73] Assignee: Mannesmann Rexroth GmbH, Lohr, Fed. Rep. of Germany

[21] Appl. No.: 655,918

[22] Filed: Feb. 15, 1991

[30] Foreign Application Priority Data

Feb. 16, 1990 [DE] Fed. Rep. of Germany ....... 4004931

[51] Int. Cl.[5] .............................................. G05D 16/10

[52] U.S. Cl. ...................................................... 137/116

[58] Field of Search ........................... 137/116, 625.66; 251/321, 337

[56] References Cited

U.S. PATENT DOCUMENTS

| | | | |
|---|---|---|---|
| 3,294,104 | 12/1966 | Mercier | 137/116 |
| 4,881,571 | 11/1989 | Reip | 137/488 |

FOREIGN PATENT DOCUMENTS

| | | |
|---|---|---|
| 3034467 | 5/1982 | Fed. Rep. of Germany . |
| 3207080 | 8/1986 | Fed. Rep. of Germany . |
| 2814301 | 9/1986 | Fed. Rep. of Germany . |
| 3245667 | 9/1986 | Fed. Rep. of Germany . |
| 3602362 | 7/1987 | Fed. Rep. of Germany . |
| 3811669 | 10/1988 | Fed. Rep. of Germany . |

OTHER PUBLICATIONS

Mannesmann Rexroth prospectus RB 26410, Dec. 1977, pp. 1-8.

*Primary Examiner*—Robert G. Nilson

*Attorney, Agent, or Firm*—Cushman, Darby & Cushman

[57] ABSTRACT

A pilot controlled sequence valve having a pilot valve and a main valve is provided. This sequence valve is preferably used for switching on and switching off a charging operation of a hydraulic accumulator. The displacement volume of the main spool of the main valve is directed via an orifice to the tank when the switching into the pressureless circulation occurs.

1 Claim, 1 Drawing Sheet

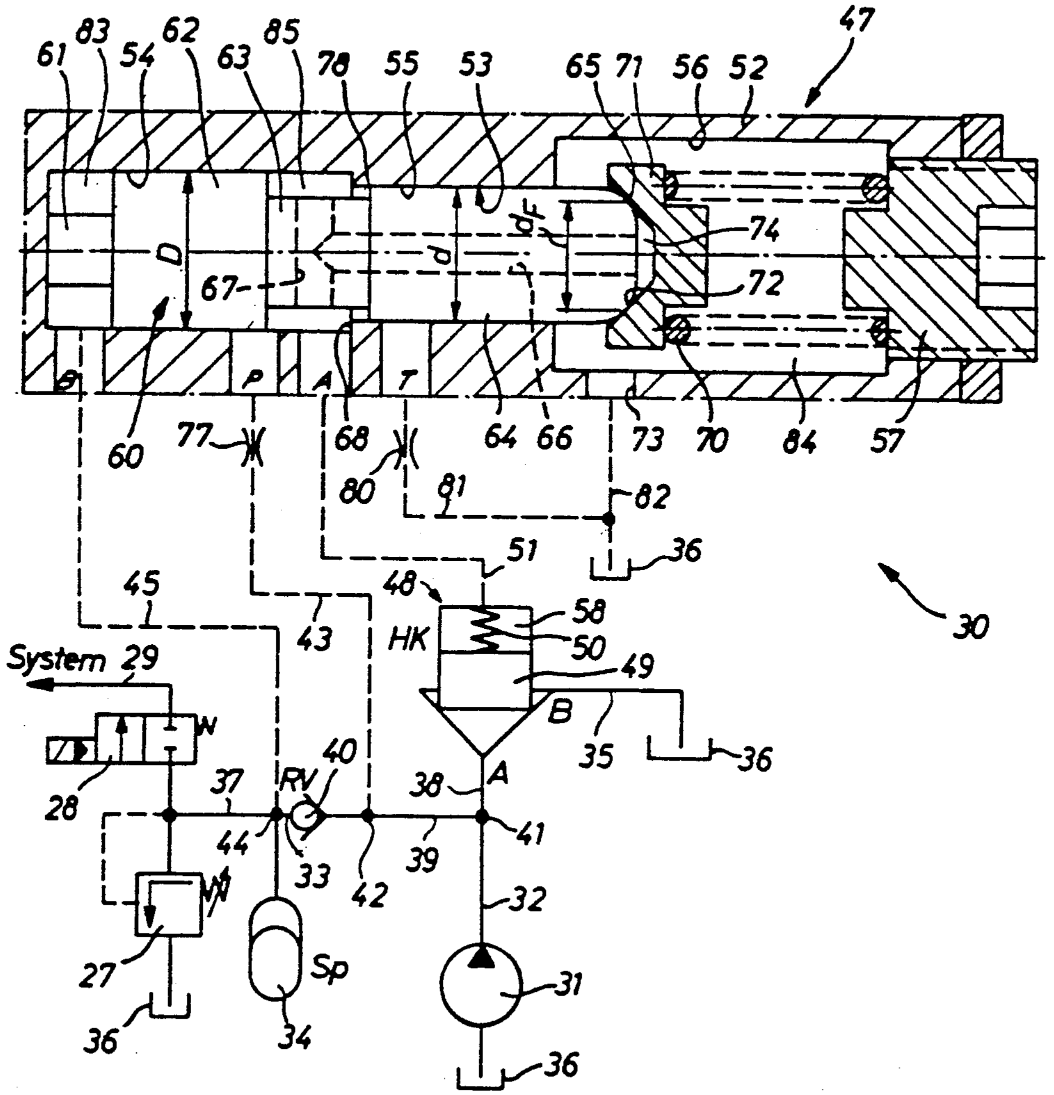
47
61
83
54
62
63
85
78
55
53
65
71
56
52
D
d
dF
67
74
72
B
P
A
T
60
77
68
80
64
66
73
70
84
57
81
82
36
51
48
58
HK
50
49
B
35
36
30
45
43
System
29
W
28
37
RV
40
38
A
44
33
42
39
41
32
27
Sp
31
36
34
36

PRESSURE SEQUENCE VALVE

FIELD OF THE INVENTION

The invention relates to a pressure sequence valve and in particular to a pilot controlled pressure sequence valve. Specifically, the invention relates to the pilot valve of a pressure sequence valve. The invention relates further generally to a hydraulic valve as well as an hydraulic apparatus for checking a connection between a pressure source and an accumulator.

BACKGROUND ART

German Offenlegungsschrift 30 34 467 relates to a pilot controlled pressure sequence valve which comprises a main valve and a pilot valve. Said pilot controlled sequence valve is used in an hydraulic apparatus for checking a connection between a source of pressure medium and an accumulator. Additional prior art is shown in the Mannesmann Rexroth prospectus RB 26410. This prior art is discussed in the introduction to the specification of said German Offenlegungsschrift 30 34 467. The object of said Offenlegungsschrift is to provide an apparatus which allows for a safe connection and separation of an accumulator. This object is solved by designing the valve member of the pilot control valve as a stepped spool, and moreover by providing two additional centrally located control spools which cooperate with the control edges of a valve housing containing the valve member. In accordance with a special design a check valve, the switch valve, the pilot valve and a throttle orifice are arranged in a common housing. With regard to the function of a sequence valve it is desirable to obtain a precise maintainance of the switch-off point and of the switch-on point for the accumulator to be charged. Moreover, for a pressureless circulation of the pump a circulation pressure should be obtained which is as low as possible, particularly, for reasons of saving energy.

Additional prior art is shown in German patent publications: DE 36 02 362 A1, DE 32 07 080 C2, DE 32 45 667 C2, DE 38 11 669 A1, De 28 14 301 C2.

It is an object of the present invention to provide a valve, in particular, a sequence valve specifically for checking a connection between a pressure source (pump) and an accumulator for such that a switching operation to the pressureless circulation (switch-off point) occuring tank pressure peaks are as low as possible and a jerk free switch-off operation is achieved while the pump circulating pressure nevertheless remains relatively small.

SUMMARY OF THE INVENTION

For a solution of this object the invention provides an orifice which is adapted to throttle the volume of pressure medium moved to the tank and displaced by the main spool of the main valve during a jerk free switch-off operation. In accordance with the invention said orifice is optimized with regard to the switch-off jerk so as to obtain a slow opening characteristic for the main spool.

In the valve design of German Offenlegungsschrift 30 34 467 the displacement volume of the main spool when switching into the pressureless circulation is removed via the head surface of the pilot control spool via a channel to the tank. If one were to install an orifice (nozzle)—as it is contemplated by the invention—for delaying the opening speed of the main spool (so as to achieve a soft switch-off characteristic), said orifice would have to be provided in the channel leading to the tank. However, such an orifice would simulaneously influence the switching speed of the pilot spool, and this would lead to a different switch-off pressure for different volume flows of the pump. Inasmuch as in accordance with the invention the tank is not connected with the end face of the control spool, such a disadvantageous effect does not occur with the present invention.

In accordance with another object of the invention, which is particularly relevant together with the above mentioned object it is desirable to avoid for a valve having a spool with which a spring plate is in abutment, transversal forces and thus frictional forces, so that particularly for a sequence valve the switch-off pressure can be maintained relatively exactly. Transveral forces can for instance be created by oblique spring ends of a spring which is in abutment with the spring plate.

The invention provides for a solution of said problem in a valve and in particular in a sequence valve by placing a hydraulic cushion between the spool and the spring plate. In this manner transversal forces created by oblique spring ends are largely compensated by said hydraulic cushion between the spool and the spring plate, and by the positioning of a pressure field (for an oblique spring plate). In accordance with a further modification of the invention, the valve spool forms at the same time together with the spring plate a pressure valve.

In accordance with a preferred embodiment of the invention a pilot control valve is provided, in particular for a pressure sequence valve, wherein the pilot control valve comprises a single piece (unitary) stepped spool as a switching element, while for a prior art pilot controlled sequence valve a two-part switching element comprising a pilot poppet and a relief spool is required.

Other advantages, objects and details of the invention may be gathered from the description of the embodiments.

BRIEF DESCRIPTION OF THE DRAWINGS

The sole FIGURE discloses an embodiment of a valve of the invention in the form of a pilot controlled sequence valve, wherein the pilot valve is shown as a longitudinal sectional view.

The pilot controlled sequence valve 30 of the invention is arranged between a pump 31 and an accumulator 34 so as to provide for an exact maintainance of the switch-off point and the switch-on point when charging the accumulator 34. As soon as the accumulator 34 is fully charged and the switch-off point is reached, the pump 31 is switched to a pressureless circulation to the tank, or, the pump can—similar to what is shown in FIG. 1 of German Offenlegungsschrift 30 34 467—supply pressure medium to any kind of user via a valve. The accumulator 34 is, on the other hand, connected via a conduit 37 to a pressure relief valve 27 leading to a tank 36. Conduit 37 is further connected via a directional control valve 28 to a conduit 29 which leads to a system which requires supply with a pressure medium. In detail, a conduit 32 extends from the pump 31 to branch point 41 from where a conduit 39 leads to a branch point 42 to which a check valve 40 is connected. The check valve 40 is, in turn connected with a conduit 33 and via branch point 44 to the accumulator 34. With said branch point 44 conduit 37 is connected.

The other conduit 38 starting from the branch point 41 leads to a port A of a main valve 48 which is preferably of cartridge design. A port B of the main valve 48 is connected via a conduit 35 with the tank 36. Alternatively, conduit 35 can be connected—similar to what is shown in FIG. 1 of said German Offenlegungsschrift 30 34 467—via valve to another user.

The main valve 48 comprises a main valve spool 49 which is biased into its closing position by a spring 50 located in a spring chamber 58.

Below, the pilot control valve 47 of the invention will be explained. Valve 47 comprises a valve housing 52 having formed therein a longitudinal bore 53 extending along a longitudinal axis of the valve housing 52. The longitudinal bore 53 forms a plurality of sections of the longitudinal bore (longitudinal bore sections) which have different diameters. There are: longitudinal bore section 54 (diameter D), longitudinal bore section 55 (diameter d) and longitudinal bore section 56 (having a diameter larger than D). Due to this design a step 68 is created. The longitudinal bore 53 is fixedly closed at one end by a part of the housing 52, while oppositely thereto an adjustment plug 57 is screwed into said housing. The adjustment plug 57 serves for the adjustment of the biasing force of a spring 70.

Within said longitudinal bore 53 a control spool 60 is reciprocally mounted. The control spool 60 is designed as a stepped spool having a plurality of spool sections with different diameters. The spool section 61 has the smallest diameter, while the adjacent spool 62 has the largest diameter D. The spool section 63 which is adjacent to the spool section 62 has a diameter which is smaller than the diameter d of the subsequent spool section 64. This way a control edge 78 is formed.

In the area of the spool section 63 one (or possibly a plurality of) cross bore 67 is formed which is connected with the space which is formed between the outer circumference of the spool section 63 and the inner circumference of the housing. The cross bore 67 is connected via a longitudinal bore 66 with an end surface facing towards a spring plate 71.

The spring plate 71 is pressed by said spring 70 against the end face or front side of the control spool 60 such that the control spool 60 abuts with its spool section 61 at the housing, if no pressure medium is supplied. For all practical purposes the spring plate is 71 a conically inclined surface 72 which is in abutment at 65 with the rounded end face of the control spool 60. Between the end face of the spool 60 and the conical inclined surface 72 facing away from the spring a pressure medium chamber 74 is defined. With said pressure medium chamber 74 a hydraulic cushion can be created between the control spool 60 and the spring plate 71. The diameter of the abutment surface of the spring plate 71 at the control spool is referred to by $d_F$. It is clear that by screwing by inserting or withdrawing the adjustment plug 57 into or out of the housing, the force can be adjusted by means of which the spring 70 urges the spring plate 71 against the control spool 60. In this manner, the switching point can be changed.

The chamber formed around the spool section 61 will be referred to as control chamber or control space 83; the chamber provided around the spring will be referred to as spring or tank chamber 84, and the chamber provided around the spool section 63 will be referred to as switching chamber 85.

The valve housing 52 is provided with ports B, P, A, T and 73.

The accumulator 34 is connected with the port B via the control circuit 45 and the conduit 33. With the port P the branch connecting point 42 is connected and thus also the pump 31 is connected with port P via conduit 43 as well as an orifice (nozzle) 77. Port A is connected via a control conduit 51 with the spring chamber 58 of the main valve 48. The tank port T is connected via an orifice 80 and a conduit 81 with the tank 36. The port 73 which is in connection with the spring chamber 84 is also in connection via a conduit 82 with the tank 36.

In the FIGURE the switch-on condition of the pilot controlled pressure sequence valve 30 is shown. In this condition the pump 31 supplies pressure medium, preferably oil, to the accumulator 34 and charges the accumulator. The built up of pressure in the accumulator 34 acts via conduit 45 in the control chamber 83. At the same time the pump is connected via orifice 77, switching chamber 85, port A and conduit 51 to the spring chamber 58 of the main valve, so that the main valve 48 is closed and does not connect the pump 31 with the tank 36.

The switch-off pressure is determined by the diameter d of the spool 60 and by the predetermined adjusted force of the spring 70. When the switch-off pressure is reached, the control spool 60 in the form of a stepped spool is moved rightwardly against the force of spring 70. During this movement the spring chamber 58 of the main valve 48 is blocked with respect to the previous connection and, instead, the spring chamber 58 is connected with the tank 36 via the switch chamber 85, the tank port T and the orifice 80. Simultaneously, the annular area D-d of the stepped spool 60 is reliefed towards tank and thus the area D of the stepped spool 60 becomes effective with the consequence that the continued switching of the stepped spool 60 is warranted.

In accordance with the invention the volume dispaced by the main spool 49 is throttled by means of the orifice 80, and thus the opening speed of the main spool 49 is delayed so as to provide for a soft switch-off operation. Due to the orifice 80 arranged according to the invention, the circulating pressure of the pump 31 is not increased inasmuch as the pilot oil inflow from the port or the side A of the main valve 48 to the spring chamber 58 of the main spool is interrupted.

In accordance with the invention the opening time as well as the closing time of the main spool 48 can be determined independently of each other by adjusting the orifices 77 and 80.

As soon as the pressureless circulation of the pump is reached, the spool surface will act corresponding to the diameter D as a metering surface or area. In accordance with the larger area of the piston diameter D with respect to the diameter d, the pressure of the accumulator has to become lower so as to initiate the next charging operation of the accumulator 34.

In accordance with a preferred embodiment of the invention the spring plate 71 forms with its seat diameter $d_F$ together with the channels in the form of longitudinal bore 66 and cross bore 67 a pressure relief valve. This valve provides an additional safety function so as to limite the maximum pump pressure should possibly a manual blockage of the spool 60 occur. By means of the hydraulic cushion, which is formed in the pressure medium chamber 74 between the control spool 60 and the spring plate 70, for instance transverse forces caused by inclined spring ends will be largely compensated. Thus, the switch-off pressure point will be maintained in a relatively exact manner.

Even though, the present invention was described above in connection with a pilot controlled sequence valve, it should be noted that the principles of the invention can also be used for other valves.

I claim:

1. A pilot control valve (47) for a sequence valve (30) having a main valve (48) for switching-on and switching-off the charging operation of a hydraulic accumulator (34), wherein:

the main valve (48) comprises a main spool (49), a displacement volume of which is discharged via an orifice 80 to tank when switching occurs into the pressureless circulation, the pilot control valve (47) comprises a housing within which a control spool (60) is reciprocally mounted, said control spool (60) being a stepped single piece spool which forms four spool sections (61 to 64) with different diameters, so as to provide four control edges, and which forms together with the housing (52) three chambers (83, 85, 84), said control spool (60) is subjected to the force of a spring (70), which acts upon said control spool (60) via a spring plate (71) and provides between the end face of said spool and the spring plate a hydraulic cushion, the end face of the control spool (60) facing towards the spring plate (71) is rounded, the spring plate comprises an inclined surface (72) for the abutment of the control spool, said control spool forming together with the spring plate (71), which is subjected to the force of the spring (70), a pressure valve, channels (66, 67) are formed in the control spool so as to form together with the spring plate (71) and the seat diameter (dF) a pressure relief valve for an additional safety function, the pilot control valve (47) has four ports (B, P, A, T) provided in the housing, including a tank port and a pump port, all arranged radially with respect to the longitudinal axis of the pilot control valve (47) and transversely with respect to a directional movement of the control spool, and a conduit (43) between the pump port and a pump having an orifice (77) and a conduit (81) between the tank port and tank having an orifice (80) such that an opening time and a closing time of the main spool (49) can be determined independently of each other in accordance with the orifices (77) and (80).

* * * * *